United States Patent [19]

Kato

[11] Patent Number: 4,905,229

[45] Date of Patent: * Feb. 27, 1990

[54] LOCAL AREA COMMUNICATION NETWORK

[75] Inventor: Haruo Kato, Tochigi, Japan

[73] Assignee: Kabushiki Kaisha Toshiba, Kawasaki, Japan

[*] Notice: The portion of the term of this patent subsequent to Feb. 14, 2006 has been disclaimed.

[21] Appl. No.: 260,867

[22] Filed: Oct. 21, 1988

Related U.S. Application Data

[63] Continuation of Ser. No. 150,500, Feb. 1, 1988, Pat. No. 47,805,168, which is a continuation of Ser. No. 806,375, Dec. 9, 1985, abandoned.

[30] Foreign Application Priority Data

Dec. 7, 1984 [JP] Japan .................. 59-259633

[51] Int. Cl.$^4$ ............................................. H04J 3/02
[52] U.S. Cl. .................................. 370/85.7; 370/16; 370/85.15; 340/825.5
[58] Field of Search ................. 370/85, 94, 86, 88, 370/89, 90, 16; 340/825.51, 825.5, 825.52, 825.01

[56] References Cited

U.S. PATENT DOCUMENTS

| | | | |
|---|---|---|---|
| 4,581,733 | 4/1986 | Sarson et al. | 370/85 |
| 4,626,843 | 12/1986 | Szeto et al. | 370/85 |
| 4,680,776 | 7/1987 | Ikeuchi et al. | 340/825.01 |
| 4,745,598 | 5/1988 | Ulug | 370/85 |

FOREIGN PATENT DOCUMENTS

| | | |
|---|---|---|
| 2022365 | 12/1979 | United Kingdom . |
| 2098027 | 11/1982 | United Kingdom . |
| 2131654 | 6/1984 | United Kingdom . |

OTHER PUBLICATIONS

ICC'84 Links for the Future, Science, Systems & Service for Communications, IEEE International Conference on Communication, May 14-17, pp. 125-129.
AFIPS, Proceedings of the National Computer Conference, vol. 45, Jun. 7-10, 1976, pp. 541-549.

*Primary Examiner*—Douglas W. Olms
*Attorney, Agent, or Firm*—Oblon, Spivak, McClelland, Maier & Neustadt

[57] ABSTRACT

A local area network system including a data transfer communication network for transferring data between plural sending and receiving nodes, and a control information communication network separate and independent of the data transfer communication network for exchanging control information between the sending and receiving nodes, whereby the overhead associated with a packet switching communication mechanism in order to distinguish between addresses or commands for each packet is remarkably decreased. According to the invention, once the connection link is established between the sending and receiving nodes, the transmission of data is completely independent of exchanging control information so that the time required to transfer data is independent of the load on the communication bus and the number of packets to be sent.

6 Claims, 3 Drawing Sheets

LOCAL AREA COMMUNICATION NETWORK

This is a continuation of application Ser. No. 07/150,500, filed Feb. 1, 1988 now U.S. Pat. No. 4,805,168 which is a continuation of Ser. No. 806,375 filed 12/09/85 now abandoned.

BACKGROUND OF THE INVENTION

1. Field of the Invention

The present invention relates to a local area communication network for data communication, having application to, for example, computer-to-computer data traffic, terminal-to-terminal data traffic, and the like.

2. Discussion of Background

A great deal of discussion can be seen in the recent literature regarding local networks and their applicability to many of today's local area communication needs. In recent times, the need to develop computer networks capable of data communication between one computer and another computer used by Local Area Communication Networks has increased, and in particular, there is a real need for a system for exchanging a large amount of information such as image data efficiently, free of error, and rapidly.

The existing Local Area Communication Network (hereinafter referred to as LAN) is commonly a packet switched network in which the data transmitted from a data sending node is temporarily stored in a packet switching exchange connected to a data sender where the data is divided into a plurality of units each of which is called a packet and the data in turn is transferred, for each packet unit, to a data receiving mode. There the packets are reassembled into the original data format.

Typically, data is placed on a commony shared communication bus to which each node, which is usually a computer station, is coupled. The conventional data sending and receiving system is next briefly described.

When a sending station receives a call originating signal transmitted from a sending terminal, the call originating signal is detected by a transmission control and, in response to the detection, a send data counter and a packet assembly counter are reset. At this time, a link establishing signal sender permits a link establishing signal to be transmitted to a receiving station. Upon receiving the link establishing signal, the receiving station permits a call signal sender to apply a call signal to a receiving terminal. Then, when the receiving station receives an answer signal at the receiving terminal, the communication link between the sending and receiving terminals is ready for establishing a communication link. Under this condition, a received packet counter and a data assembly counter are reset for receiving a packet from the sending station, and a link establishing ready signal is issued to the sending station. Upon receiving the link establishing ready signal, the sending station drives a communication ready signal sender to transmit a communication ready signal to the sending terminal thereby resulting in establishing the communication link between the sending terminal and the receiving terminal. After establishing of such communication link, data transmitted from the transmitting terminal is divided into packets whichin turn are delivered via available routes selected at that time by a host computer, for example, which provides overall control of communication among the nodes of the network. Each packet is routed through a switching office to the receiving station. The receiving mode reassembles the received packets into the original format of the data intended to be sent to the receiving mode. On the other hand, the receiving terminal issues a correct checking answer indicating the received data is correct or an incorrect checking answer indicating that the received data is erroneous. The receiving station receives these checking answers and modifies the packets to the correct packet form.

In this manner, each node in the local area communication network systems has been burdened with the tasks of establishing the communication link, addressing, common bus management, and generating a handshake over the bus back to the sender, etc.

To do these tasks, most networks have the appropriate protocols, which are used to perform each task efficiently in each layer of the layered network, which is organized as a series of layers designated for different functions.

In conventional data transmission systems, data, address and control information are transmitted through the commonly shared bus, and time to process addresses, as well as control information within the protocol in the corresponding layer, is required. This greatly increased the overhead so that the time required to transfer data increases.

SUMMARY OF THE INVENTION

Accordingly, an object of the present invention is to provide a novel local area network system using a packet switching network having improved data transmission efficiency for exchanging a large amount of information between nodes distributed along the network.

Another object of the present invention is to provide a novel local area network system using a packet switching network which enables control of the flow of a large packet containing a large amount of data by means of a small packet containing control messages for data flow control, and which results in transferring a large amount of information efficiently.

A still further object of the present invention is to provide a local area network system including two distinct and independent buses which are assigned for transmission of data and control messages, respectively.

These and other objects are achieved according to the invention by providing a new and improved local area network system including a data transfer communication network for transfering data between plural sending and receiving nodes, and a control information communication network separate and independent of the data transfer communication network for exchanging control information between the sending and receiving nodes. Since the two networks are separate and distinct, transfer of control information between two nodes can occur during simultaneous data transmission between another two nodes. Accordingly, the overhead associated with a packet switching communication mechanism in order to distinguish between addresses or commands of every packet is remarkably decreased.

According to the invention, once the connection link is established between the sending and the receiving nodes, the transmission of data is completely independent of exchanging control information so that the time required to transfer data is independent of the load on the communication bus and the number of packets to be sent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
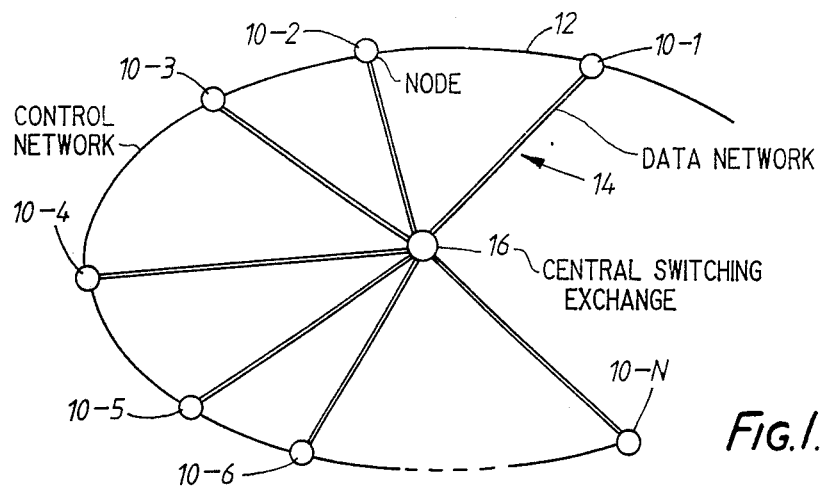
FIG. 1 is a block diagram of an example of a local area communication network topology according to the present invention.

Referring now to the drawings, wherein like reference numerals designate identical or corresponding parts throughtou the several views, and more particularly to FIG. 1 thereof, a local area communication network is illustrated and may include a plurality of machines called nodes 10-1 to 10-N, each of which may be an independent computer processor. The nodes are distributed along an interprocessor bus 12 directly connecting the nodes, and communicate with one another through this directed bus 12 (hereinafter referred to as a control network). In addition, the nodes are connected by another network 14 (hereinafter referred to as switched data network) conceptionally employing a star topology and including a central switching exchange 16. The plurality of nodes are connected to both the networks 12 and 14, and the local area communication network system consisting of the nodes connected as shown is capable of transmitting and receiving through both networks. The communication medium for the two networks may be a twisted pair, a coaxial cable, an optical fiber, or wave guide.

In this embodiment, the data to be transferred, such as image data, are transferred on the directed bus 14 which employs, for example, the communication medium of an optical fiber. On the other hand, the control messages for the flow control of data are transmitted and received through the network bus 12 employing, for example, a coaxial cable as its communication medium.

Figure 2A:
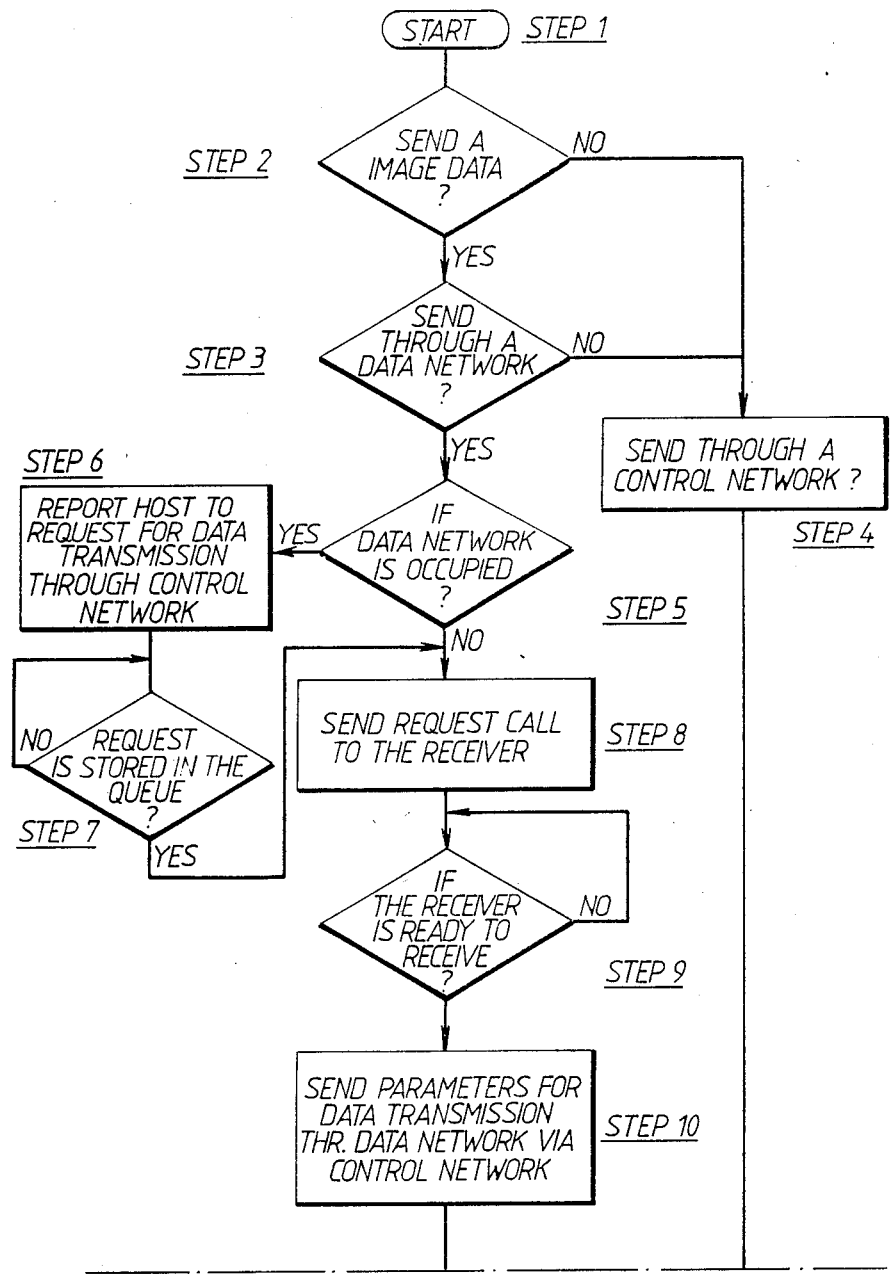
FIGS. 2A and 2B are flowcharts illustrating the sending and receiving of data of a local area communications network system employing a packet switching network of an embodiment according to the present invention.
Figure 2B:
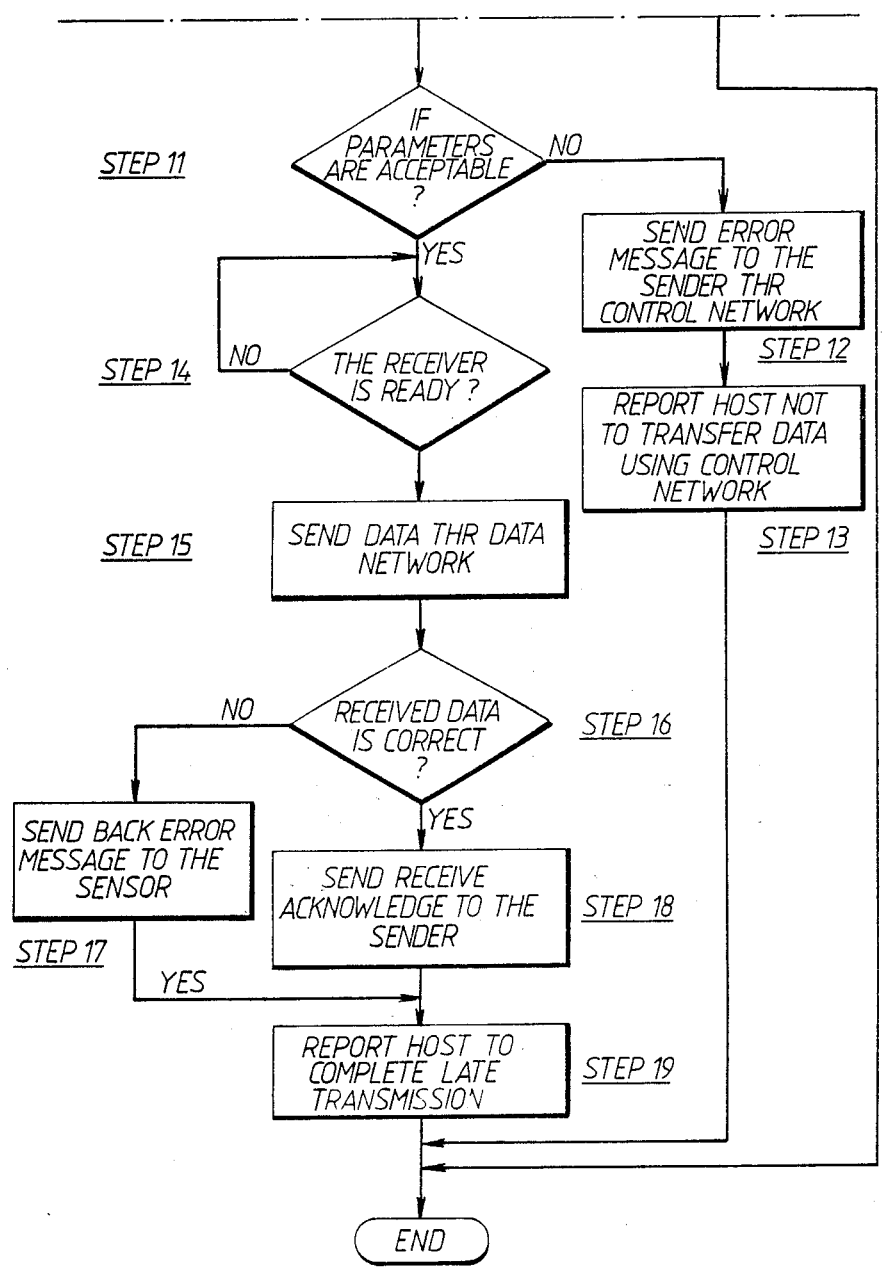

An explanation of data flow control according to the present invention will be given in reference to FIGS. 2A and 2B.

Upon command (for bringing the node to the ready state, i.e., a state in which each node is operable and ready to communicate), the following basic steps are executed:

Step 1.
Undertake "the start" procedure and then proceed with Step 2.

Step 2
Check whether or not a large amount of data such as image data is expected to be transmitted. If so then proceed with step 3, otherwise go to step 4.

Step 3
Determine whether a data network of high-speed communication bus is to be used for transmission of such data. If so, then proceed with step 5, otherwise go to step 4.

Step 4
Attempt transmission of data through a control network having a low-speed bus, complete transmission of the packets and go to "END".

Step 5
Oversee and monitor the data network of the high-speed bus, if the data network is available for transmission of data, then proceed with step 8; otherwise go to step 6.

Step 6
Transmit Host Computer request RQ from one node for communication with another destination node through the control network in order to register its request, then proceed with step 7.

Step 7
Wait until the requesting node's request for communication is registered in a priority queue in the host computer, which determines priority of communication between the nodes based on predetermined priority relationships assigned to the node. If its request occurs first in the priority queue, then go to step 8.

Step 8
Propagate call request signal CR to the destination through the control network, then proceed with step 9.

Step 9
Receive call accept signal CA from the destination, then proceed with step 10, otherwise go to Step 8.

Step 10
Send a control message with control parameters through the control network for the purpose of controlling subsequent data transmission between the sender and the receiver through the data network, e.g., under management by the central switching exchange 16 of FIG. 1, then go to step 11.

Step 11
Check whether such control parameters are correct or not in the receiver; if correct, then proceed with step 14, otherwise go to step 12.

Step 12
Send back an error message EM to the sender, then proceed with step 13.

Step 13.
The receiving node sends a message NC indicating that transmission is not carried out to Host computer, then go to "END".

Step 14
The receiving node sends a communication ready signal CT through the control network to the sending node, then proceed with step 15.

Step 15
The sending node transmits data to the receiving node through the data network, and after completion of data transmission proceed with step 16.

Step 16
Check whether the receiving data is correct or erroneous in the receiving node, for example, using parity checking techniques and issue the corresponding checking answer. If the received data is correct, proceed with step 18, otherwise go to step 17.

Step 17
Transmit an incorrect checking answer NK to the sending node through the control network, then proceed with step 18.

Step 18

Transmit a correct checking answer AK to the sending node through the control network, then proceed with step 19.

Step 19

Send message complete indicating that transmission of data was completed to the Host computer through the control network so that the host computer closes the connection by having both of the sending and receiving nodes exchange "CLOSE" messages.

Considering now the operation of the local area communication network system in accordance with the present invention, let it be assumed that the node 10-2 wishes to transmit image data of 1 Mbytes to the node 10-6 via the networks shown in FIG. 1. In the exemplary illustration of the operation of the system, let it be assumed that the system architecture is based on a carrier sense multiple access with collision detection (CSMA/CD) mechanism as exemplified by the so-called ETHERNET, as disclosed in U.S. Pat. No. 4,063,220 to Metcalfe et al. In CSMA/CD, users (nodes) transmit any time they desire. When conflicts (consisting of overlapping packet transmission) occur, the conflicting users schedule retransmission of their packets to some later time, and incur a random rescheduling delay.

Now, initially, the node 10-2, hereinafter referred to as a sending terminal (ST), sends a message which is a request for the transfer of information containing data of 1 Mbytes to the node 10-6, hereinafter referred to as a receiving terminal (RT) via the cotrol network 12. After receiving the request message from the sending terminal (ST), the receiving terminal (RT) is prepared to receive data from the sending terminal (ST), and then it is placed in a receiving ready condition. The receiving terminal (RT) sends a RECEIVE READY signal via the control network 12 to the sending terminal (ST). In response to this RECEIVE READY signal, the sending terminal (ST) transmits data packets over the data network 14 to the receiving terminal (RT).

When the receiving terminal (RT) for which the transmitted data is intended has indicated that it has captured data correctly by placing a handshake signal on the control network 12, the sending terminal (ST) has confirmation that all the desired data has been sent to the designated receiving terminal.

In case that the received data is erroneous, in accordance with the checking answer NK (indicating that the received data is erroneous), the sending terminal (ST) retransmits the same data.

On the other hand, if the sending terminal (ST) finds the addressed receiving terminal (RT) to be communicating with another node via the data network 14, it monitors the bus 14, and waits until the bus 14 goes idle. Also, when the addressed receiving terminal (RT) is occupied in communication with another terminal the receiver sends a message indicating its present state to the expected sender through the control network 12. Thereafter, once such transmission of data is finished, the addressed receiving terminal (RT) becomes ready to receive data from the expected sending terminal (ST), and then sends the RECEIVE READY signal via the control network 12 to the sending terminal (ST).

In response to the RECEIVE READY signal sent through the control network 12 from the receiving terminal (RT), the sending terminal (ST) begins immediately to transmit data through the data network 14 to the receiving terminal (RT). These procedures take place along with flow chart steps shown in FIG. 2.

Thus, the control messages for data transmission between the sending terminal and the receiving terminal are exchanged via the control network 12 formed by, for example, a low-speed bus, and after establishing the connection between the sending and receiving terminals, the sending terminal transmits its desired data to the addressed receiving terminal via the data network, which, for example, consists of a high-speed bus, whereby for a large amount of information to be transmitted from the sending terminal to the receiving terminal, each protocol in the terminals is simplified, and furthermore, the overhead prior to transmission of data due to the burden of control for the flow of data is remarkably reduced.

In other words, the present invention enables rapid and efficient transmission of a large amount of information from one node to any other node coupled to the networks.

As previously described, the scheme by which a node communicates with another node is the subject matter to which the invention is directed and, the circuitry components within the node itself, the bus, and the connections to it may be of a conventional configuration and do not form the subject matter of the present invention. Accordingly, a description of such components is omitted.

Figure 3:
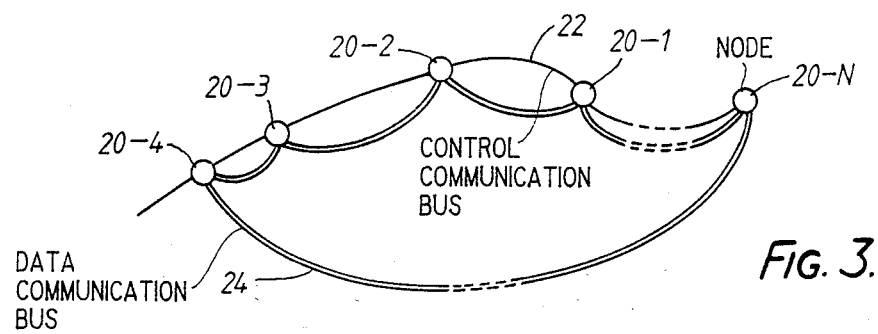
FIG. 3 is a block diagram of a local area communication network topology, in which one network has a loop topology, according to a second embodiment of the present invention.
Figure 4:
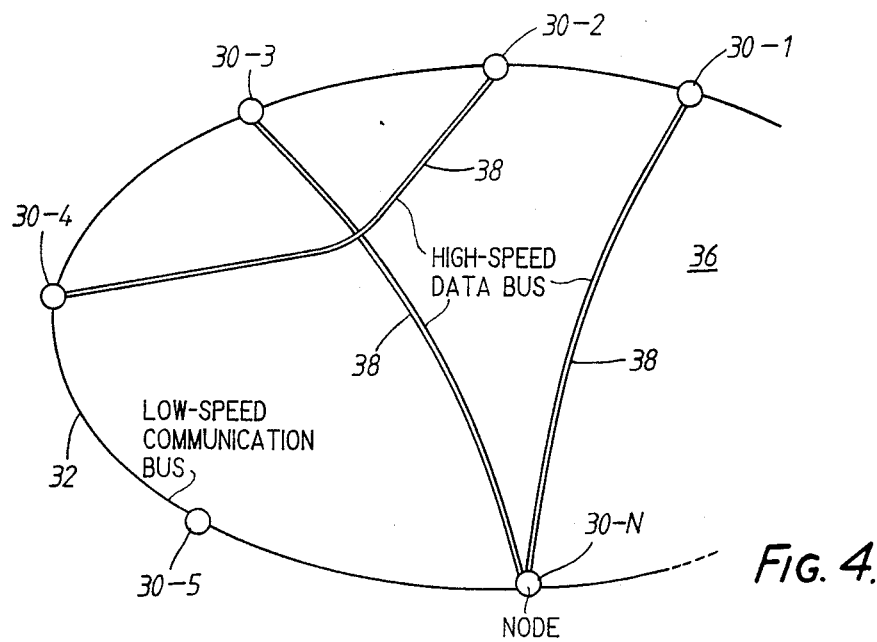
FIG. 4 is a block diagram of a local area communication network topology, in which one network has an irregular topology, according to a third embodiment of the present invention.

In the following discussion, several alternatives are discussed regarding the network topology, based on a control network and a data network for respectively and separately exchanging control messages and data. As illustrated in FIG. 3, nodes 20-1 to 20-N are connected to a control communication bus 22 and a data communication bus 24 having a loop shape. Another alternative is depicted in FIG. 4. If a high-speed transmission of data between any two nodes among all nodes 30-1 to 30-N is not required, the nodes which definitely wish to communicate with one another in a high-speed transmission mode are connected by the data network 36 of a high-speed bus 38, and all nodes 30-1 to 30-N including the high-speed transmission mode nodes are distributed along another network 32 in the form of low-speed communication bus.

The major feature of this topology rests on the fact that the whole system of the local area communication network is constructed at low cost due to non-necessity of connecting all nodes by the high-speed communication bus.

As explained above, the communication medium constituting the data communication bus and the control communication channel may be a coaxial cable operating at 70 MBPS (mbits per second), or an optical fiber at the speed of 400 MBPS. If higher data rates are required, the network architectures employ optical fibers as the communication medium. However instead of the point-to-point connections between nodes necessitated by the above-noted communication mediums, another possible medium is free space, i.e., beams traveling in air, which has the advantage of eliminating the point-to-point connections between the nodes.

For inexpensively constructing the local area communication network system to achieve the principle according to the present invention, it is considered to connect to the existing local network, which serves as one network, an additional network including a high-speed optical fiber communication bus.

Next described are feasible alternatives for the cable, disregarding considerations of complexity, cost or implementation preference. When an appropriate cable having multiple transmission capability, such as an electro-optical multiplex system, is used as a communication bus, it is possible to send different data over the multiple transmission cable simultaneously, and even through one of the separate connections set up by the multiple transmission bus is disabled for transmission, it is allowed to communicate with another node via the rest of the enabled connections.

While preferred embodiments in accordance with the present invention are above described, it is to be understood that the same is not limited thereto, and that the present invention is also applicable to cover other communication media such as bidirectional communication buses, fiber optics, broadband communication techniques, and the like. Also, the present invention is intended to cover general communication configurations which employ the basic transmission mechanism set forth above, as, for example, the control network being used for data transfer instead of the control information, in response to a particular need.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A local area communication network comprising:
    a plurality of input/output data terminal equipment nodes;
    a first network means for establishing first communication paths by means of a first communication medium for said nodes, and for transmitting data information between at least one data communication sending node which rearranges the data information into data units for transmission via the first communication medium and at least one receiving node which receives the transmitted data units and reassembles the received data units into the data information; and
    a second network means for establishing second communication paths independently of said first communication paths by means of a second communication medium between said data communication sending and receiving nodes, and for transmitting selectively via said second communication medium one of control information to cause said first network means to be available for data communication and data to be sent between said nodes, said control information including parameters of communication control which determine, at least, data unit addressing functions, type of data unit service, node operation characteristics and error reporting functions; and
    means for selecting whether or not to transmit said data via said first network means or via said second network means.

2. A local area communication network according to claim 1, wherein said first communication medium forming said first transmission channel is a high-speed transmission medium relative to said second communication medium.

3. A local area communication network according to claim 2, wherein said second network means comprises:
    transmission channels between predetermined communication sending nodes and receiving nodes having a configuration different than the configuration of said first transmission channel.

4. A local area communication network according to claim 1, wherein said first network means is capable of transmitting data information independent of transmission of control information through said second network means.

5. A local area communication network according to claim 4, wherein said first communication medium is free space.

6. A local area communication network comprising:
    a plurality of input/output data terminal equipment nodes;
    a first network means for establishing a first communication path between one data communication sending node and receiving node among said nodes to transmit data information via said first communication path;
    a second network means being also coupled to said nodes, for establishing independently of said first communication path a second communication path between two nodes expecting communication with one another for transmitting selectively one of control information to cause said first communication path to be available for data information communication and data information to be sent between said nodes; and
    means for selecting whether or not to transmit said data information via said first network means or via said second network means.

* * * * *